F. M. WALKER.
CORN HUSKER.
No. 19,320. Patented Feb. 9, 1858.
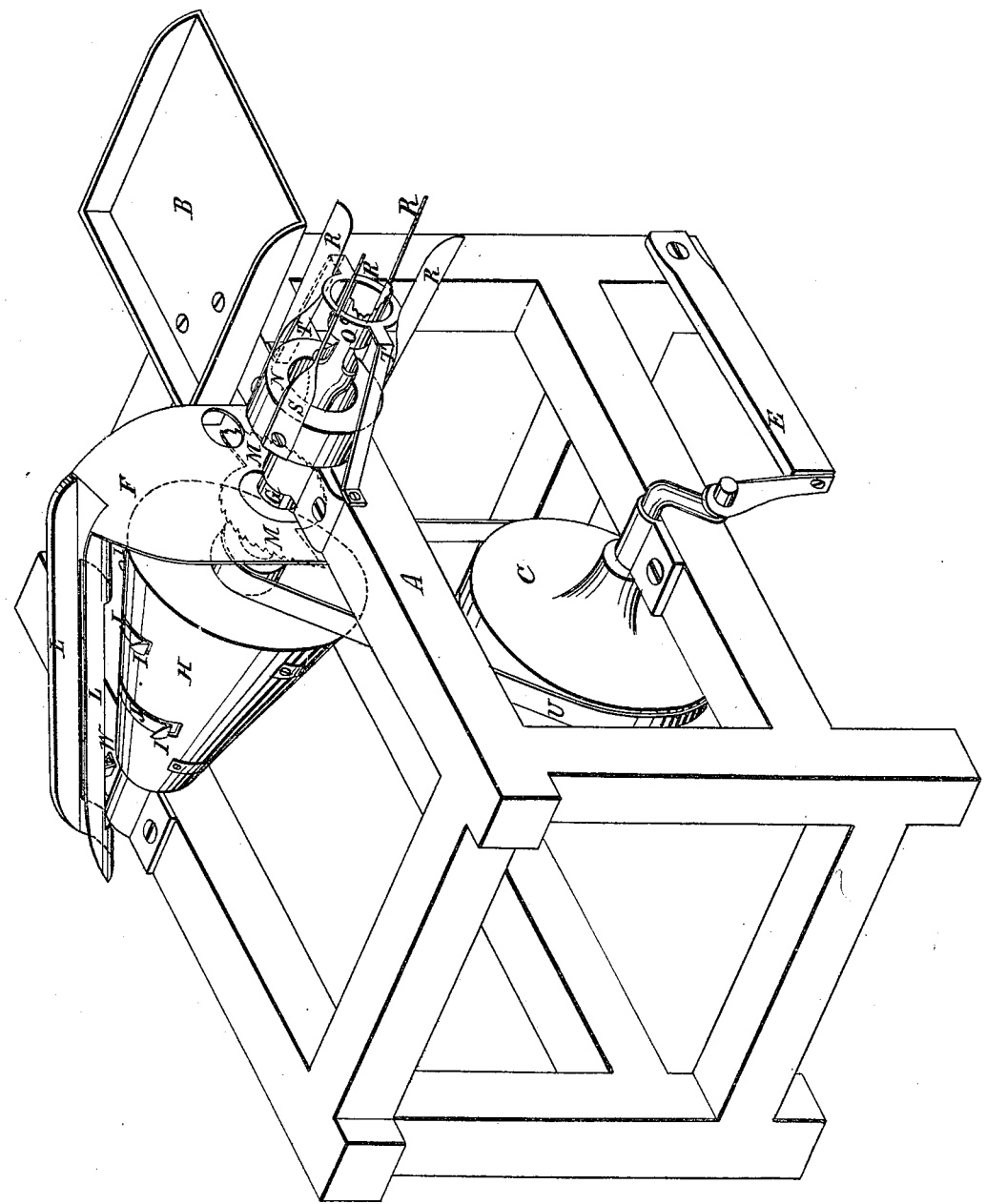

UNITED STATES PATENT OFFICE.

F. M. WALKER, OF GREENSBORO, NORTH CAROLINA.

CORN-HUSKER.

Specification of Letters Patent No. 19,320, dated February 9, 1858.

*To all whom it may concern:*

Be it known that I, F. M. WALKER, of Greensboro, in the county of Guilford and State of North Carolina, have invented a new and Improved Machine for Husking Corn; and I do hereby declare that the following is a full and exact description, to wit:

The nature of my invention consists in certain improvements in corn huskers hereinafter more fully described.

To enable others skilled in the art to make and use my invention, I will proceed to describe its construction and operation, reference being had to the annexed drawings making part of this specification in which is shown a perspective view of the machine, the parts, of which, is A the frame, B, a table upon which is placed the unhusked corn, ready for the hand of the operator, C, a driving wheel to which is attached a band V, G, a shaft supported by the frame A, one end of the shaft projects over the outside of the frame A, to which is attached a hollow cylindrical knife, O, with diagonal serrated teeth on the back.

R, are guide knives attached to springs S, which are fastened by means of screws, at the end, to a hollow nut, N, and at equal distances around; the edges of the knives, are turned all to the center; the hollow nut N is fastened to the top of the frame and through it the shaft G passes and revolves; to the end of the shaft the knife O is attached which projects out beyond the springs S so that their diagonal edges shall be opposite the edges of the guide knives R.

T, T, are guards one of them shown in dotted lines. F, an upright supporter to the guide bars L, L to be made of metal or any other suitable material, fastened to the shaft G and rotating with it are two half circle serrated knives M, and partly seen through a circular opening, d, in the upright F, and are used to cut off the butt of the unhusked ear of corn previous to its being stripped of the husk.

H is a cone through which the shaft, G, runs upon which are placed the husking teeth I, I, attached to springs J, J, fastened to the cone; under the springs are grooves to allow the teeth to vibrate when they come in contact with the ears of corn.

L, L, are guide bars placed over cone H. W is a brace to support the lower end of the guide bars.

The operator stands in front of the corn husker and works the treadle F with his left foot, and by means of the band, U, attached and running around the pulley C, turns the shaft G, to which is attached the knife O, the knives M, M, and the cone H. The ear of corn is then thrust in the opening, d, and the butt cut off by the knives M, M, and then forced into the end of the cylindrical knife O where it is held firm by the spring knives R while the knife O cuts and loosens the husk. It is then thrown up between the guide bars, L, L, and rests on top of the cone H, while the husking teeth I, I, strip off the husks and by means of the vibrating springs J, J, the husk is thrown off under the cone, while the ear cleaned of the husk passes off at the lower end of the guide bars.

What I claim as my invention and desire to secure by Letters Patent is—

The cone H, armed with the spring teeth J, I, in combination with the guide bars L, L, and upright piece F the whole being constructed operated and arranged in the manner and for the purpose set forth.

F. M. WALKER.

Witnesses:
WM. H. FAUCETT,
J. W. C. WOOLLEN.